United States Patent
Barbu et al.

(10) Patent No.: US 8,009,900 B2
(45) Date of Patent: Aug. 30, 2011

(54) SYSTEM AND METHOD FOR DETECTING AN OBJECT IN A HIGH DIMENSIONAL SPACE

(75) Inventors: Adrian Barbu, Plainsboro, NJ (US);
Yefeng Zheng, Plainsboro, NJ (US);
Jing Yang, Jersey City, NJ (US);
Bogdan Georgescu, Plainsboro, NJ (US); Dorin Comaniciu, Princeton Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1016 days.

(21) Appl. No.: 11/856,208

(22) Filed: Sep. 17, 2007

(65) Prior Publication Data
US 2008/0085050 A1 Apr. 10, 2008

Related U.S. Application Data

(60) Provisional application No. 60/827,233, filed on Sep. 28, 2006.

(51) Int. Cl.
*G06K 9/00* (2006.01)
*G06K 9/62* (2006.01)

(52) U.S. Cl. .................. 382/154; 382/159; 345/419

(58) Field of Classification Search .................. 382/154, 382/159, 160, 285; 345/419–427; 356/12–14; 348/42–60
See application file for complete search history.

(56) References Cited

U.S. PATENT DOCUMENTS

| 6,829,384 | B2 * | 12/2004 | Schneiderman et al. | 382/154 |
| 6,944,319 | B1 * | 9/2005 | Huang et al. | 382/118 |
| 7,127,087 | B2 * | 10/2006 | Huang et al. | 382/118 |
| 7,308,134 | B2 * | 12/2007 | Wersing et al. | 382/161 |
| 7,590,266 | B2 * | 9/2009 | Kato et al. | 382/118 |
| 7,792,342 | B2 * | 9/2010 | Barbu et al. | 382/128 |
| 2002/0159627 | A1 * | 10/2002 | Schneiderman et al. | 382/154 |
| 2002/0165837 | A1 * | 11/2002 | Zhang et al. | 706/16 |
| 2003/0035573 | A1 * | 2/2003 | Duta et al. | 382/128 |
| 2005/0058337 | A1 * | 3/2005 | Fujimura et al. | 382/159 |
| 2006/0074834 | A1 * | 4/2006 | Dong et al. | 706/45 |
| 2006/0088207 | A1 * | 4/2006 | Schneiderman | 382/159 |
| 2006/0110029 | A1 * | 5/2006 | Kazui et al. | 382/159 |
| 2006/0224539 | A1 * | 10/2006 | Zhang et al. | 706/20 |
| 2007/0036429 | A1 * | 2/2007 | Terakawa | 382/159 |
| 2007/0073114 | A1 * | 3/2007 | Gundel | 600/300 |
| 2007/0140541 | A1 * | 6/2007 | Bae et al. | 382/131 |
| 2007/0270692 | A1 * | 11/2007 | Barbu et al. | 600/431 |
| 2008/0005180 | A1 * | 1/2008 | Kunze | 707/104.1 |
| 2008/0085050 | A1 * | 4/2008 | Barbu et al. | 382/154 |
| 2008/0101676 | A1 * | 5/2008 | Zheng et al. | 382/131 |
| 2008/0211812 | A1 * | 9/2008 | Barbu et al. | 345/424 |
| 2010/0040272 | A1 * | 2/2010 | Zheng et al. | 382/131 |

OTHER PUBLICATIONS

Barbu et al., "Hierarchical Learning of Curves Application to Guidewire Localization in Flouroscopy", IEEE Conference on Computer Vision and Pattern Recognition, 2007, CVPR '07, 2007.*

* cited by examiner

*Primary Examiner* — Aaron Carter

(57) ABSTRACT

A system and method for detecting an object in a high dimensional image space is disclosed. A three dimensional image of an object is received. A first classifier is trained in the marginal space of the object center location which generates a predetermined number of candidate object center locations. A second classifier is trained to identify potential object center locations and orientations from the predetermined number of candidate object center locations and maintaining a subset of the candidate object center locations. A third classifier is trained to identify potential locations, orientations and scale of the object center from the subset of the candidate object center locations. A single candidate object pose for the object is identified.

18 Claims, 6 Drawing Sheets

SYSTEM AND METHOD FOR DETECTING AN OBJECT IN A HIGH DIMENSIONAL SPACE

CROSS REFERENCE TO RELATED APPLICATION

This application claims the benefit of U.S. Provisional Application Ser. No. 60/827,733, filed Sep. 28, 2006 which is incorporated by reference in its entirety.

FIELD OF THE INVENTION

The present invention is directed to a system and method for detecting an object in a high dimensional space, and more particularly, to a system and method for using marginal space learning to detect an object in a high dimensional space.

BACKGROUND OF THE INVENTION

Many three dimensional (3D) detection and segmentation problems are confronted with searching in a high dimensional space. For example, a 3D similarity transformation is characterized by nine parameters: three position parameters, three orientation parameters and three scale parameters. It is very expensive to search the entire space for detection of an object. The search for all these parameters becomes computationally prohibitive, even if coarse-to-fine strategies are involved. Moreover, training a discriminative classifier using positive and negative examples for an object with so many parameters is challenging, because hardware limitations only allow a relatively small number of negatives at a time (on the order of $10^6$). To handle all the possible negative examples, multiple levels of bootstrapping have to be employed, making the whole system even slower.

But there are many cases when the objects to be detected are naturally aligned in some way. For example, most faces in pictures are approximately horizontal and have approximately the same skin color. Similarly, most hearts in CT scans have approximately the same size and orientation. There is a need for a method for fast detection of an object in a high dimensional space in which the search space can be greatly reduced while still retaining accurate results.

SUMMARY OF THE INVENTION

A system and method for detecting an object in a high dimensional image space is disclosed. A three dimensional image of an object is received. A first classifier is trained in the marginal space of the object center location which generates a predetermined number of candidate object center locations. A second classifier is trained to identify potential object center locations and orientations from the predetermined number of candidate object center locations and maintaining a subset of the candidate object center locations. A third classifier is trained to identify potential locations, orientations and scale of the object center from the subset of the candidate object center locations. A single candidate object pose for the object is identified.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

Figure 1:
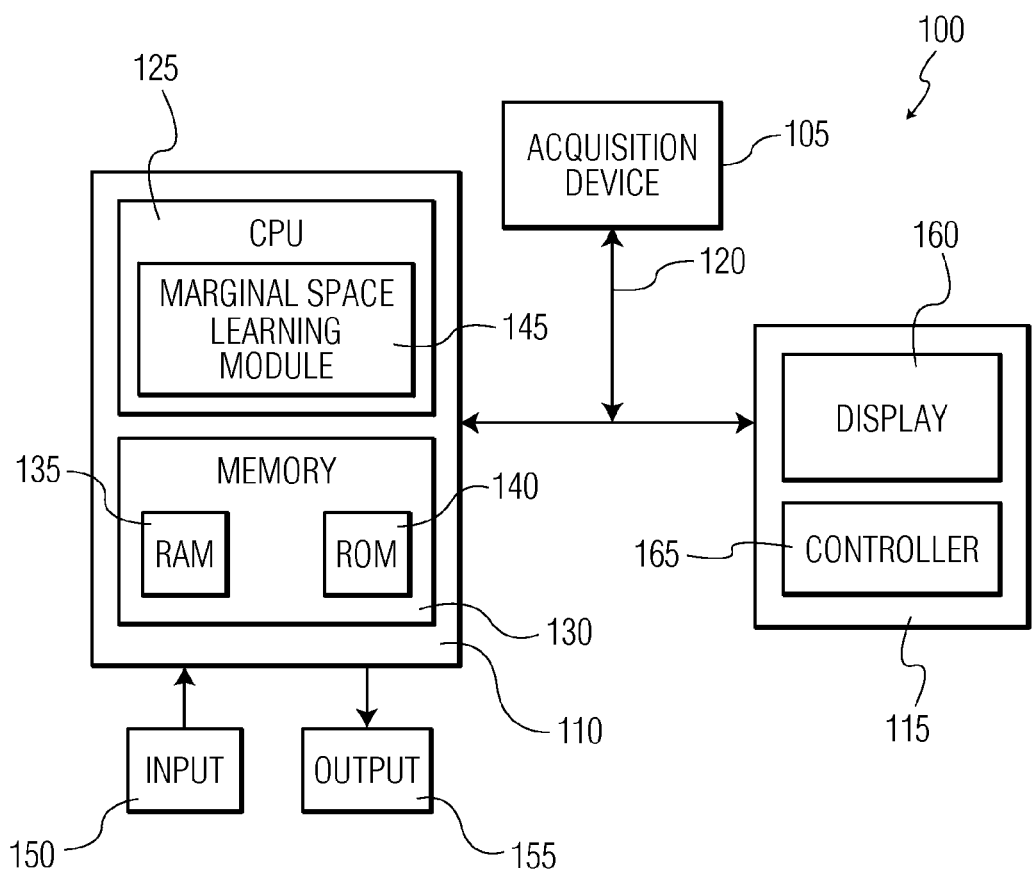
FIG. 1 is a block diagram of an exemplary system for implementing fast detection of an object in a high dimensional space in accordance with the present invention.

The present invention is directed to a system and method for detecting an object in a high dimensional image space. FIG. 1 illustrates a system 100 for detecting an object in a high dimensional image space according to an exemplary embodiment of the present invention. The examples described herein will be directed to the detection of an anatomical structure in a three dimensional medical image. However, it is to be understood by those skilled in the art that the method and system are not limited to detection of anatomical structures and can be used to detect other objects such as faces, pedestrians, vehicles, and traffic signs, without departing from the scope and spirit of the present invention. As shown in FIG. 1, the system 100 includes an acquisition device 105, a personal computer (PC) 110 and an operator's console 115 connected over a wired or wireless network 120.

The acquisition device 105 may be a computed tomography (CT) imaging device or any other three-dimensional (3D) high-resolution imaging device such as a magnetic resonance (MR) scanner or ultrasound scanner.

The PC 110, which may be a portable or laptop computer, a medical diagnostic imaging system or a picture archiving communications system (PACS) data management station, includes a central processing unit (CPU) 125 and a memory 130 connected to an input device 150 and an output device 155. The CPU 125 includes a marginal space learning module 145 that includes one or more methods for detecting an anatomical structure in three dimensional medical images to be discussed hereinafter. Although shown inside the CPU 125, the marginal space learning module 145 can be located outside the CPU 125.

The memory 130 includes a random access memory (RAM) 135 and a read-only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, printer, etc.

The operation of the system 100 can be controlled from the operator's console 115, which includes a controller 165, e.g., a keyboard, and a display 160. The operator's console 115 communicates with the PC 110 and the acquisition device 105 so that image data collected by the acquisition device 105 can be rendered by the PC 110 and viewed on the display 160. The PC 110 can be configured to operate and display information provided by the acquisition device 105 absent the operator's console 115, by using, e.g., the input 150 and output 155 devices to execute certain tasks performed by the controller 165 and display 160.

The operator's console 115 may further include any suitable image rendering system/tool/application that can process digital image data of an acquired image dataset (or portion thereof) to generate and display images on the display 160. More specifically, the image rendering system may be an application that provides rendering and visualization of medical image data, and which executes on a general purpose or specific computer workstation. The PC 110 can also include the above-mentioned image rendering system/tool/application.

Figure 2:
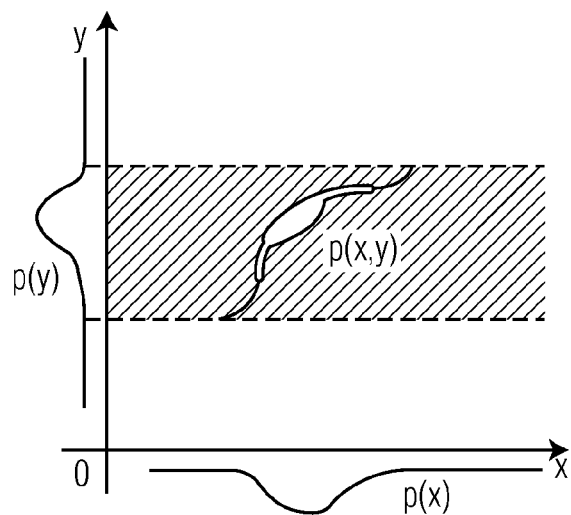
FIG. 2 illustrates a projected distribution for training a classifier using marginal space learning in accordance with an aspect of the present invention.

Marginal Space Learning (MSL) takes advantage of the fact that most data have some mildly invariant properties (e.g., hearts in CT images have approximately the same size and orientation). As such, a large part of the space can be eliminated by detection in a marginal space where only some parameters are considered and the rest are integrated out. There are also many cases when the objects to be detected are naturally aligned in some way. This natural alignment can be exploited to train a classifier in a projected distribution as shown in FIG. 2, which exists over a marginal space of smaller dimension (e.g., a 3-parameter left ventricle center position space instead of a 9-parameter left ventricle similarity transformation space). Then, the search space can be restricted to candidates whose projections to the marginal space have high probability values based on the trained marginal space classifier.

In MSL, a classifier is trained on a marginal space in which some of the variables are ignored. For example, a classifier trained on p(y) can quickly eliminate a large portion of the search space. Another classifier is trained on the remaining space to obtain the final classification results.

Figure 3:
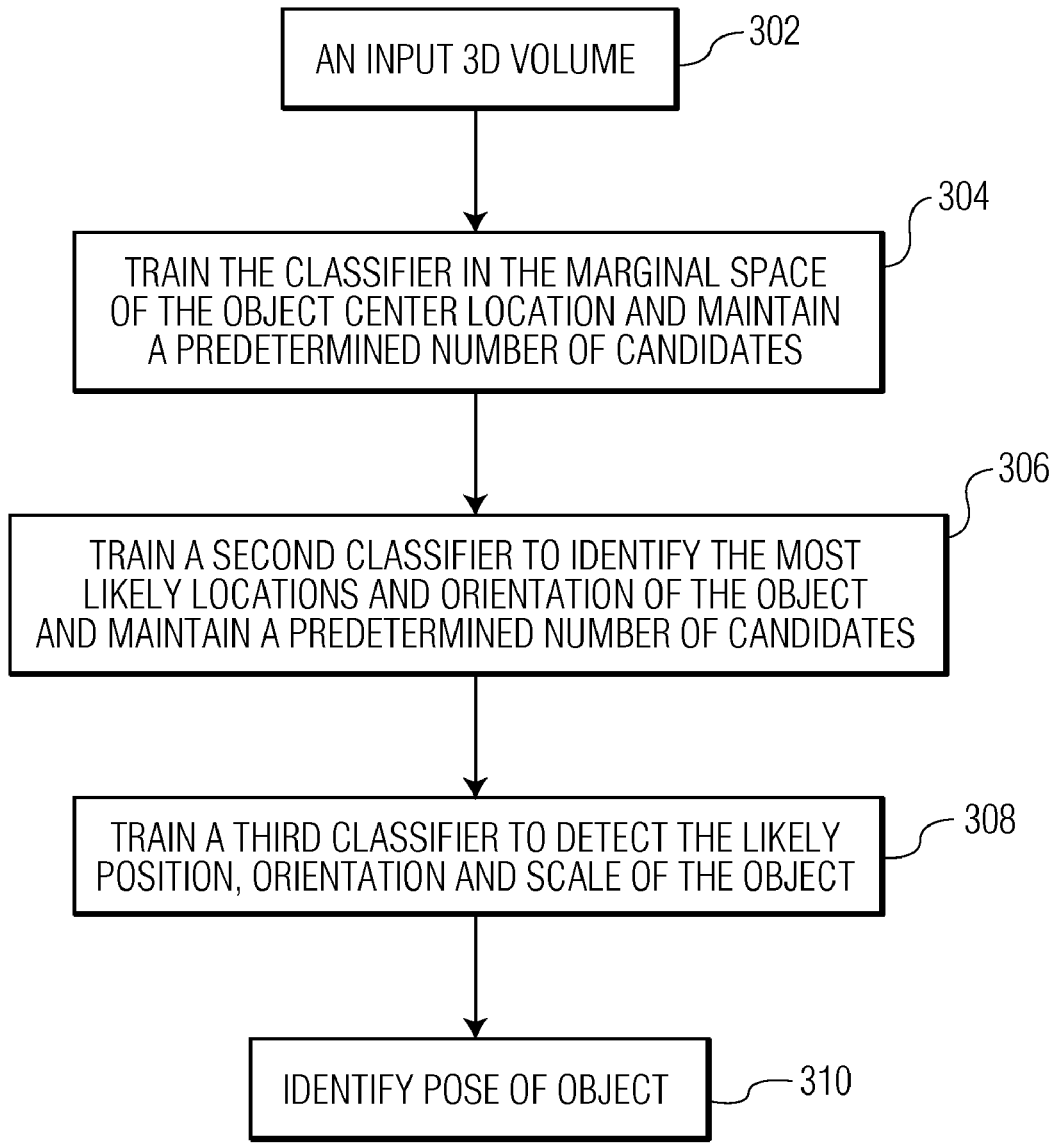
FIG. 3 is a flow chart depicting the detection of a Left Ventricle in a Computed Tomography image in accordance with an embodiment of the present invention.
Figure 4:
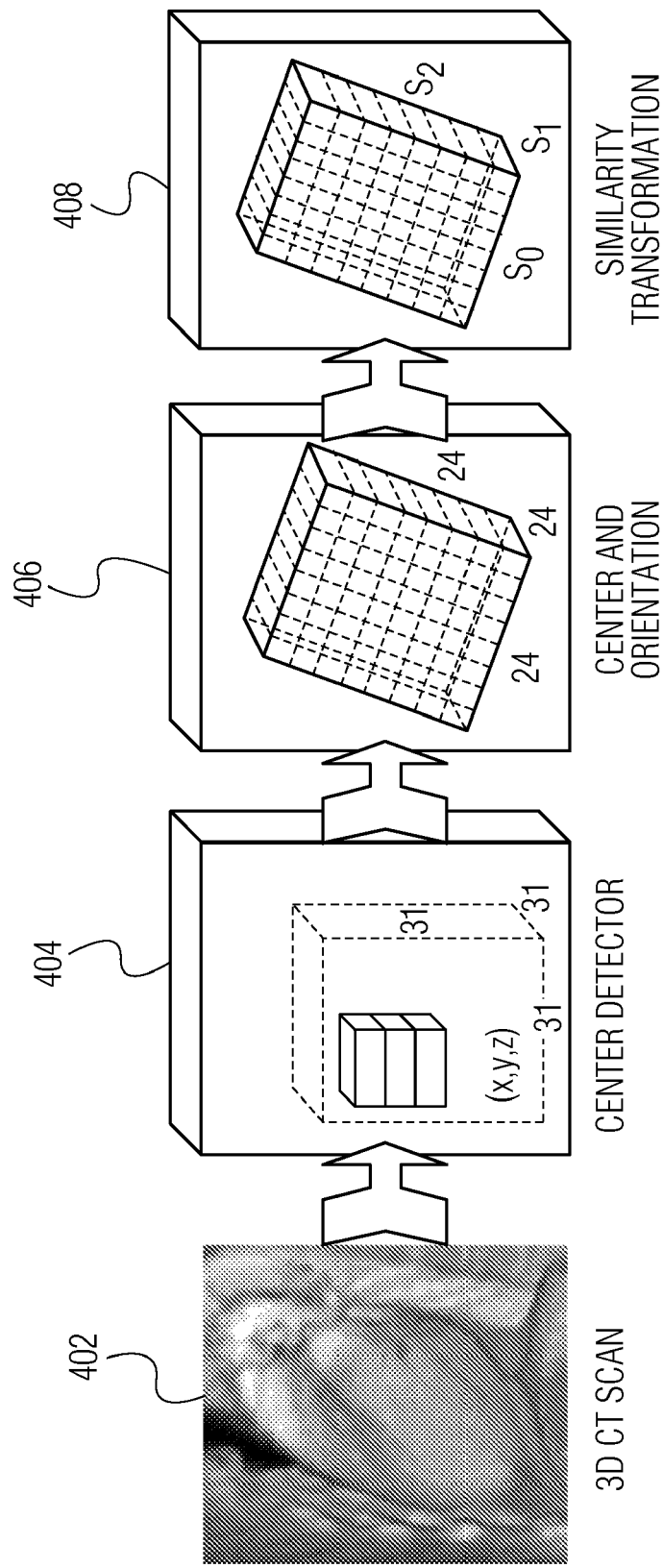
FIG. 4 is a functional block diagram that illustrates the steps performed to detect the left ventricle using marginal space learning in accordance with an aspect of the present invention.

An embodiment of the present invention will now be described in the context of an example in which detection of a Left Ventricle (LV) in a Computed Tomography (CT) image is performed. MSL is used to detect the LV up to a similarity transformation in 3D CT images. FIG. 3 illustrates a flow chart that depicts an exemplary method for detecting an LV in accordance with the present invention. FIG. 4 is a functional block diagram that illustrates the steps performed to detect the LV using marginal space learning in accordance with an aspect of the present invention.

An image of an LV is received (402). A classifier is used to find the 3D location x=(x, y, z) of the LV center (step 302, 404). The classifier is trained in the marginal space of LV center locations. For each 3D input data, the best 400 locations are kept for further evaluation (step 304). It is to be understood by those skilled in the art that the number of locations kept for further evaluation can vary without departing from the scope and spirit of the present invention.

For the 400 candidate locations, another classifier is used to keep the most promising 3D locations and orientations (x, θ)=(x, y, z, $\theta_1$, $\theta_2$, $\theta_3$) of the LV (step 306, 406). Thus, this classifier is trained in the 6-dimensional marginal space of locations and orientations. The best 50 candidate locations and orientations are kept for further evaluation. It is to be understood by those skilled in the art that the number of candidate locations and orientations kept for further evaluation can vary without departing from the scope and spirit of the present invention. Finally, a trained classifier is used to detect the LV up to a 9-dimensional similarity transformation (i.e., position, orientation and scale) (step 308, 408)

$$T=(x, \theta, s)=(x, y, z, \theta_1, \theta_2, \theta_3, s_1, s_2, s_3) \quad (1)$$

A single candidate is the output of this stage (step 310).

Figure 5:
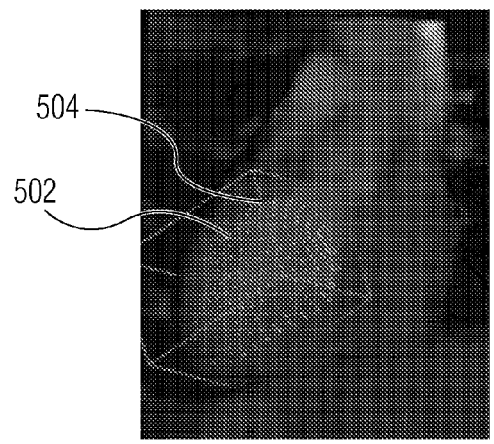
FIG. 5 illustrates an example of an annotated object.

The training set is comprised of a number of image volumes. The shape of each LV in the training image volumes is annotated using a 3D mesh comprising 514 points. FIG. 5 shows an example of an LV that has been annotated with a 3D mesh 502 and a corresponding bounding box 504. The LV apex, the A3C plane and the main axis are used to align the shapes to each other. Principal Component Analysis (PCA) is performed on the aligned shapes and the best 50 PCA bases are used to describe the shape variability.

The method described in FIGS. 3 and 4 will now be described in greater detail. To detect the LV center location 402, a classifier is trained based on 3D Haar features. For better data alignment and performance, the LV center is detected in image volumes which are subsampled to a voxel size of 3 mm. At this resolution, a volume has a size of approximately 50×50×60 voxels. The training set comprises a number of image volumes (e.g., 100 image volumes), all resized at 3 mm voxel size.

The 3D Haar filters are chosen from inside a horizontal cube of size 31×31×31 voxels centered at the sample location. A pool of about 10,000 Haar features is selected for training. The number of positives is increased by adding positives perturbed by 1-2 voxels from their true location, for robustness. This allows for about 6000 positives to be obtained from 100 training image volumes. The negatives are chosen randomly inside the image volume, at a distance of at least 5 voxels from the true center location. About 1 million negatives are used for training.

A Probabilistic Boosting Tree (PBT) is used for training and detection, because it returns a probability between 0 and 1 for each sample. The PBT is described in detail in co-pending patent application Ser. No. 11/366,722, filed Mar. 2, 2006 and entitled "Probabilistic Boosting Tree Framework for Learning Discriminative Models," which is incorporated by reference in its entirety. A PBT is trained with five levels of which the first two were enforced as cascade.

Figure 6:
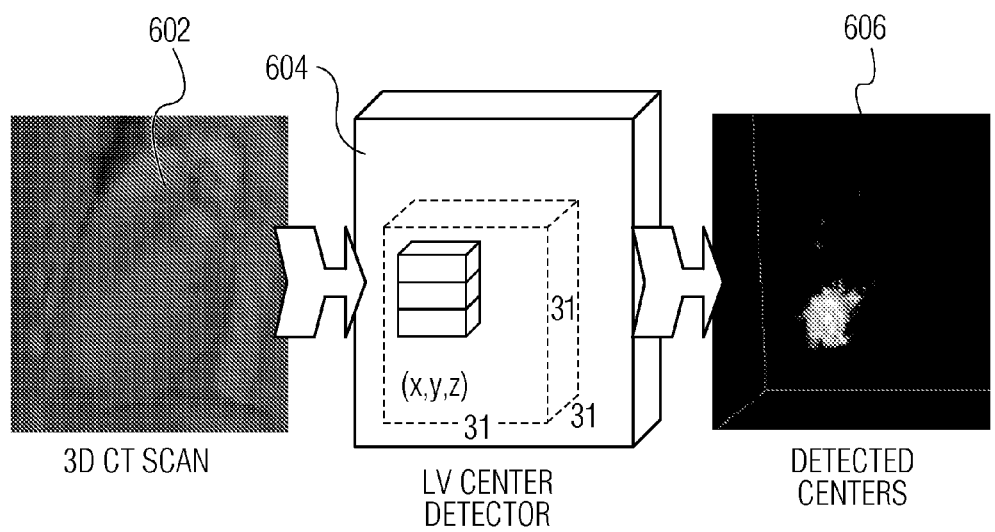
FIG. 6 illustrates a functional block diagram of the LV center localization method in accordance with an aspect of the present invention.

FIG. 6 illustrates a functional block diagram that shows the basic LV center detection method. The input image volume 602 is resized at 3 mm voxel resolution. The LV center detection uses 3D Haar features in the image volume 604. The Haar features are chosen from inside a box of size 31×31×31 voxels which is shown by the dotted lines centered at the sample location. The detection result is a small blob of voxels around the true center location 606. The best 400 locations are kept for further evaluation, while the rest are discarded. An evaluation of this level indicated that all the true center locations are among the 400 candidate locations. The method reduces the search space of location from about 50×50×60=150,000 to 400, which is a reduction in magnitude of more than 300.

The second classifier works in the 6-dimensional space of locations and orientations (x, θ). This space is limited to values (x, θ) for which the location x is among the 400 candidates obtained by the location detector and therefore this 6-dimensional space has already been made more than 300 times smaller.

Figure 7:
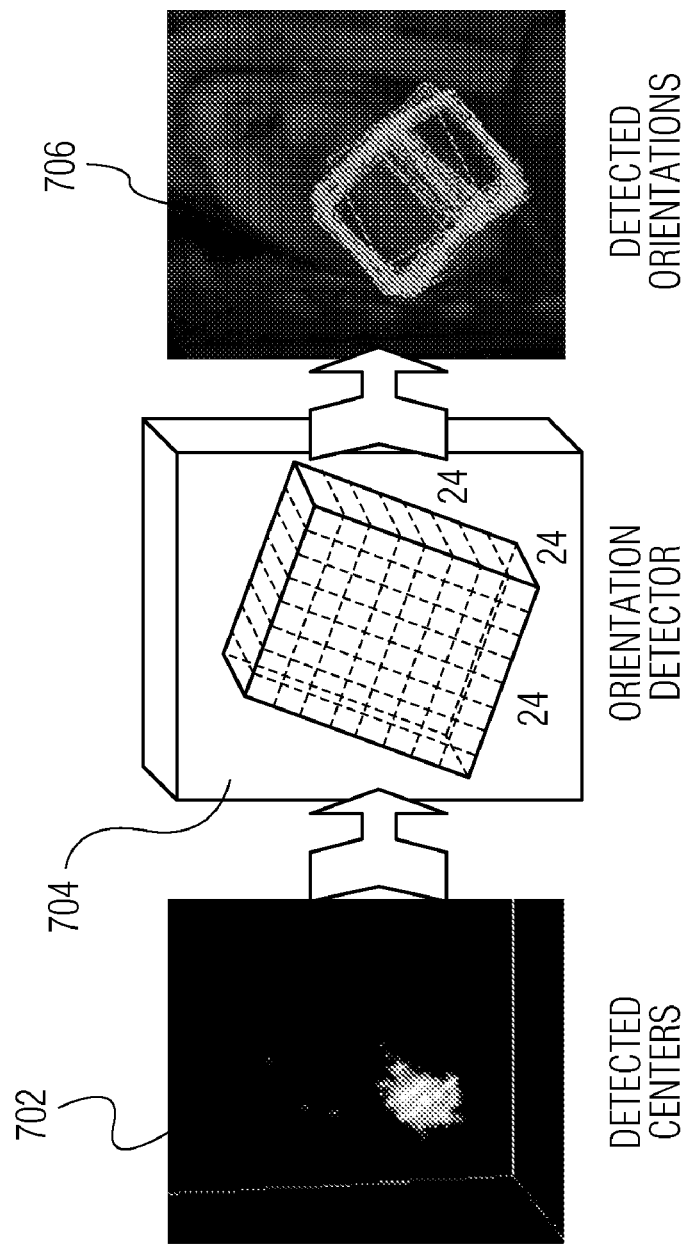
FIG. 7 is a functional block diagram of the LV center and orientation detection method in accordance with an aspect of the present invention.

FIG. 7 is a functional block diagram of the method in which orientations for the locations are found. The locations for which the orientations are to be found are determined by the center detection method which results in a cluster of detected centers 702. The LV orientation detection uses 3D curvature features to detect orientations 704. Each feature is computed as a specific voxel location inside a box of size 24×24×24 voxels, translated and rotated by the sample's position and orientation. Inside this box, the locations are organized on a 9×9×9 lattice, so there are 729 different locations where a feature can be computed. At each of these locations, there are 71 different combinations (sum, product, quotient, inverse trigonometric functions, etc.) of the gradient, min and max curvatures, principal directions and volume data. This gives 729×71=51,759 features. Moreover, there are three scales at which the features are computed: 3 mm, 6 mm, and 12 mm, obtaining a total of about 150,000 features. The positives and negatives are chosen to have the location x among the 400 candidates from the first stage. The best 50 candidates (x, θ) are kept for further evaluation 706.

An important issue that appears is how to obtain a meaningful distance between the samples and the ground truth. This distance will be used to generate the positives and negatives, since samples which are really close to the ground truth should be considered positives, while samples which are further than some threshold are negatives.

To compute the distance to the ground truth, each sample (x, θ) is augmented with the mean scale $s_0$ which is obtained from the statistics of the training data. Using the resulting similarity transformation T=(x, θ, $s_0$), a rescaled mean shape is obtained. The mean shape was obtained when the Procrustes analysis was performed on the 98 training shapes. Thus the average point-to-point distance between the corresponding rescaled mean shapes is the distance between two samples.

The positives are chosen to have a distance of at most 6 mm, while the negatives are at a distance of at least 15 mm. From the output of the detector, the best 50 candidates (x, θ) are kept, the rest being discarded.

The dimensionality of the search space is increased again to add the LV scale. The similarity transformation T=(x, θ, s) is in a 9-dimensional space, but the first 6 dimensions (x, θ) are restricted to take only 50 values obtained from the previous stage. The same sample pool of features is used as in the LV orientation detection stage, with the difference now that for each sample (x, θ, s), the box in which these features are computed is now (x, θ, 4/3s). A single candidate is chosen after this stage.

A similar approach can be used to detect the Left Atrium (LA). To detect the LA up to a similarity transformation in 2D, a 5-dimensional space is searched: position (x,y), orientation θ and scale (s,a) (scale and aspect ratio). Using the MSL approach three classifiers are trained. A first classifier is trained to detect the LA position. Because the LA in the ultrasound data exhibits a very large degree of variability in size, a very coarse size is also estimated with three values small, medium and large. The best 1000 candidates are kept for further processing. A second classifier is trained to infer for each candidate the LA orientation and one scale parameter. Again, the best 1000 candidates are kept for further processing. A final classifier is trained to infer the aspect ratio for each of the 1000 candidates and the average of the best 20 detections are reported as the detection results.

Figure 8:
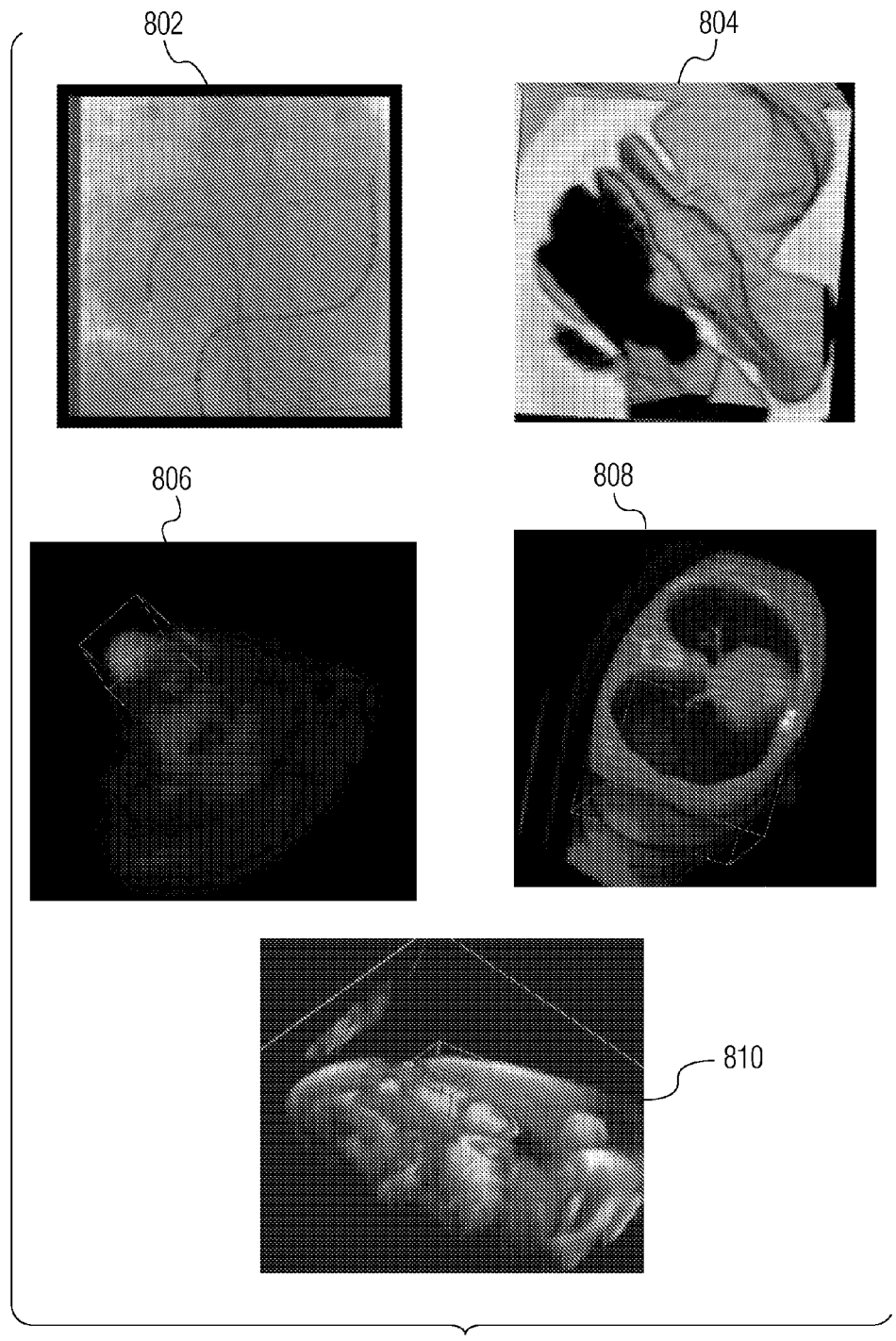
FIG. 8 illustrates the application of MSL to several other object detection problems in medical imaging.

MSL is general approach and can be applied to many challenging 2D and 3D object detection and segmentation tasks in medical imaging. FIG. 8 shows the application of MSL to detect catheter tips in X-ray images (802), ileocecal valves (804) and livers (806) in abdominal CT, heart chambers in ultrasound images (808), and heart chambers in MRI (810).

Having described embodiments for a system and method for detecting an object in a high dimensional space, it is noted that modifications and variations can be made by persons skilled in the art in light of the above teachings. It is therefore to be understood that chances may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for detecting an object in a high dimensional image space comprising:
   receiving a three dimensional image of an object;
   training, by a processor, a first classifier in the marginal space of the object center location which generates a predetermined number of candidate object center locations;
   training, by the processor, a second classifier to identify potential object center locations and orientations from the predetermined number of candidate object center locations and maintaining a subset of the candidate object center locations;
   training, by the processor, a third classifier to identify potential locations, orientations and scale of the object center from the subset of the candidate object center locations; and
   identifying a single candidate object pose for the object.

2. The method of claim 1 wherein the first classifier is trained using 3D Haar features that are subsampled in the image.

3. The method of claim 2 wherein a Probabilistic Boosting Tree is used to train the 3D Haar features.

4. The method of claim 1 wherein the second classifier is trained using curvature features.

5. The method of claim 4 wherein the second classifier works in six dimensional space of locations and orientations.

6. The method of claim 1 wherein the third classifier is trained in nine dimensional space of locations, orientations and scale.

7. The method of claim 1 wherein the object is a left ventricle.

8. The method of claim 1 wherein object is a left atrium.

9. The method of claim 7 wherein the 3D image is a 3D computed tomography image.

10. A system for detecting objects in a high dimensional image space comprising:
    an acquisition device for acquiring three dimensional images of an object;
    a processor that receives the acquired three dimensional images of the object, the processor performing the following steps on each image:
      training a first classifier in the marginal space of the object center location which generates a predetermined number of candidate object center locations,
      training a second classifier to identify potential object center locations and orientations from the predetermined number of candidate object center locations and maintaining a subset of the candidate object center locations,
      training a third classifier to identify potential locations, orientations and scale of the object center from the subset of the candidate object center locations, and
      identifying a single candidate object pose for the object; and
    a display for displaying the detected object.

11. The system of claim 10 wherein the first classifier is trained using 3D Haar features that are subsampled in the image.

12. The system of claim 11 wherein a Probabilistic Boosting Tree is used to train the 3D Haar features.

13. The system of claim 10 wherein the second classifier is trained using curvature features.

14. The system of claim 13 wherein the second classifier works in six dimensional space of locations and orientations.

15. The system of claim 10 wherein the third classifier is trained in nine dimensional space of locations, orientations and scale.

16. The system of claim 10 wherein the object is a left ventricle.

17. The system of claim 10 wherein object is a left atrium.

18. The system of claim 16 wherein the 3D image is a 3D computed tomography image.

* * * * *